United States Patent
Nagar et al.

(10) Patent No.: US 11,635,808 B2
(45) Date of Patent: Apr. 25, 2023

(54) RENDERING INFORMATION IN A GAZE TRACKING DEVICE ON CONTROLLABLE DEVICES IN A FIELD OF VIEW TO REMOTELY CONTROL

(71) Applicant: INTERNATIONAL BUSINESS MACHINES CORPORATION, Armonk, NY (US)

(72) Inventors: Raghuveer Prasad Nagar, Kota (IN); Sarbajit K. Rakshit, Kolkata (IN); Reji Jose, Bangalore (IN); Manish Agrawal, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/401,293

(22) Filed: Aug. 12, 2021

(65) Prior Publication Data
US 2023/0050547 A1 Feb. 16, 2023

(51) Int. Cl.
*G06F 3/01* (2006.01)
(52) U.S. Cl.
CPC .................................. *G06F 3/013* (2013.01)
(58) Field of Classification Search
CPC ........................................................ G06F 3/013
See application file for complete search history.

(56) References Cited

U.S. PATENT DOCUMENTS

| | | | | |
|---|---|---|---|---|
| 9,330,499 | B2* | 5/2016 | Perez | G06F 3/013 |
| 9,639,968 | B2* | 5/2017 | Kim | G06F 3/013 |
| 10,186,086 | B2 | 1/2019 | Giraldi et al. | |
| 11,086,581 | B2* | 8/2021 | Stoyles | G06F 3/0346 |
| 11,256,336 | B2* | 2/2022 | Schoen | G06F 3/011 |
| 2004/0233222 | A1 | 11/2004 | Lee et al. | |
| 2007/0006092 | A1 | 1/2007 | Makela | |

(Continued)

FOREIGN PATENT DOCUMENTS

WO WO-2019067902 A1 * 4/2019 ......... G02B 27/0093

OTHER PUBLICATIONS

Anonymous, "Method and System for Controlling Augmented Reality Content with Head and Facial Movement Pattern", IP.com No. IPCOM000261616D, Mar. 20, 2020, 6 pp.

(Continued)

*Primary Examiner* — Doon Y Chow
*Assistant Examiner* — Dennis Chow
(74) *Attorney, Agent, or Firm* — Konrad Raynes Davda & Victor LLP; David W. Victor

(57) ABSTRACT

Provided are a computer program product, system, and method for rendering information in a gaze tracking device on controllable devices in a field of view to remotely control. A determination is made of a field of view from the gaze tracking device of a user based on a user position. Devices are determined in the field of view the user is capable of remotely controlling to render in the gaze tracking device. An augmented reality representation of information on the determined devices is rendered in a view of the gaze tracking device. User controls are received to remotely control a target device comprising one of the determined devices for which information is rendered in the gaze tracking device. The received user controls are transmitted to the target device to control the target device.

20 Claims, 9 Drawing Sheets

(56) References Cited

U.S. PATENT DOCUMENTS

| | | | |
|---|---|---|---|
| 2013/0050432 A1* | 2/2013 | Perez | G06F 3/011 |
| | | | 348/47 |
| 2016/0274762 A1 | 9/2016 | Lopez et al. | |
| 2016/0364911 A1 | 12/2016 | Jo et al. | |
| 2017/0181802 A1 | 6/2017 | Sachs et al. | |
| 2017/0255286 A1 | 9/2017 | Jayaraj et al. | |
| 2018/0143432 A1 | 5/2018 | Li et al. | |
| 2018/0196522 A1* | 7/2018 | Rochford | G06F 3/011 |
| 2019/0025587 A1 | 1/2019 | Osterhout et al. | |
| 2019/0129607 A1* | 5/2019 | Saurabh | G06F 3/011 |
| 2019/0339770 A1* | 11/2019 | Kurlethimar | G06F 3/0346 |
| 2020/0301513 A1* | 9/2020 | Mejia Cobo | G06F 3/011 |
| 2022/0190243 A1* | 6/2022 | Bagheri | H01L 49/006 |

OTHER PUBLICATIONS

Blanco-Novoa, O., et al., "Creating an Internet of Augmented Things: An Open-Source Framework to Make IoT Devices and Augmented and Mixed Reality Systems Talk to Each Other", Sensors 2020, 20, 3328, Published Jun. 11, 2020, 27 pp.

Stark, E., et al., "Using Augmented Reality and Internet of Things for Control and Monitoring of Mechatronic Devices", Electronics 2020, 9, 1272, Published Aug. 7, 2020, 21 pp.

Yusuf, Z., et al., "Unleashing the Power of Data with IoT and Augmented Reality", Mar. 2020, 24 pp.

U.S. Appl. No. 16/831,679, Invented by Nagar et al., filed Mar. 26, 2020, 35 pp.

PCT International Search Report and Written Opinion, dated Nov. 25, 2022, 12pp., for International Application No. PCT/EP2022/071718.

* cited by examiner

Device Information Request

Device Information

Historical Device Control Information

RENDERING INFORMATION IN A GAZE TRACKING DEVICE ON CONTROLLABLE DEVICES IN A FIELD OF VIEW TO REMOTELY CONTROL

BACKGROUND OF THE INVENTION

1. Field of the Invention

The present invention relates to a computer program product, system, and method for rendering information in a gaze tracking device on controllable devices in a field of view to remotely control.

2. Description of the Related Art

Augmented reality systems may be used to control machines and devices connected in the Internet of Things (IOT). Augmented reality (AR) is a live, direct or indirect view of a physical, real-world environment whose elements are augmented (or supplemented) by computer-generated sensory input such as sound, video, and graphics that may be rendered in the field of view of a user wearing a gaze tracking device creating the augmented reality representations. Augmented reality is an overlay of content on the real world. Mixed reality (MR) is the merging of real and virtual worlds to produce new environments and visualizations where physical and digital objects co-exist and interact in real time. Mixed reality involves an overlay of synthetic content on the real world that is anchored to and interacts with the real world.

Augmented reality applications have been used to maintain, diagnose, and operate complex machines in industrial environments. A limited group of authorized employees may be given access to the augmented reality tools to control the devices, which eliminates the need to implement physical control panels any person can access. This merging of augmented reality with the Internet of Things is referred to as the "Internet of Augmented Things".

There is a need in the art for developing applications for gaze tracking devices to overlay augmented reality representations into a field of view of a user to enhance the user ability to control devices in the user field of view.

SUMMARY

Provided are a computer program product, system, and method for rendering information in a gaze tracking device on controllable devices in a field of view to remotely control. A determination is made of a field of view from the gaze tracking device of a user based on a user position. Devices are determined in the field of view the user is capable of remotely controlling to render in the gaze tracking device. An augmented reality representation of information on the determined devices is rendered in a view of the gaze tracking device. User controls are received to remotely control a target device comprising one of the determined devices for which information is rendered in the gaze tracking device. The received user controls are transmitted to the target device to control the target device.

DETAILED DESCRIPTION

With an augmented reality gaze tracking device, also referred to as "AR glass", the gaze tracking device may use augmented reality vision to provide supplemental information for devices in a user's field of view. If the field of view covers a large area with numerous devices to control, such as numerous machines in a very large manufacturing facility or warehouse, then the user may experience difficulty in precisely selecting devices and directing controls to control the devices which appear distant from the user or clustered with other devices.

Described embodiments provide improvements to augmented reality technology to control devices in situations where the field of view surrounding is very large with a large number of devices in the user line-of-sight resulting in the user having difficulty selecting and controlling devices. Described embodiments provide improvements to augmented reality technology to allow the user to select a desired target region of the field of view and then provide in greater visual detail information or a view of the devices in the target region through augmented reality representations of a magnified view of the target region or images and information on the devices for the user to control. By providing an enhanced view of devices in a target region of the field of view, the user may more easily select and direct control to those devices presented in the augmented reality representation of the target region.

Figure 1:
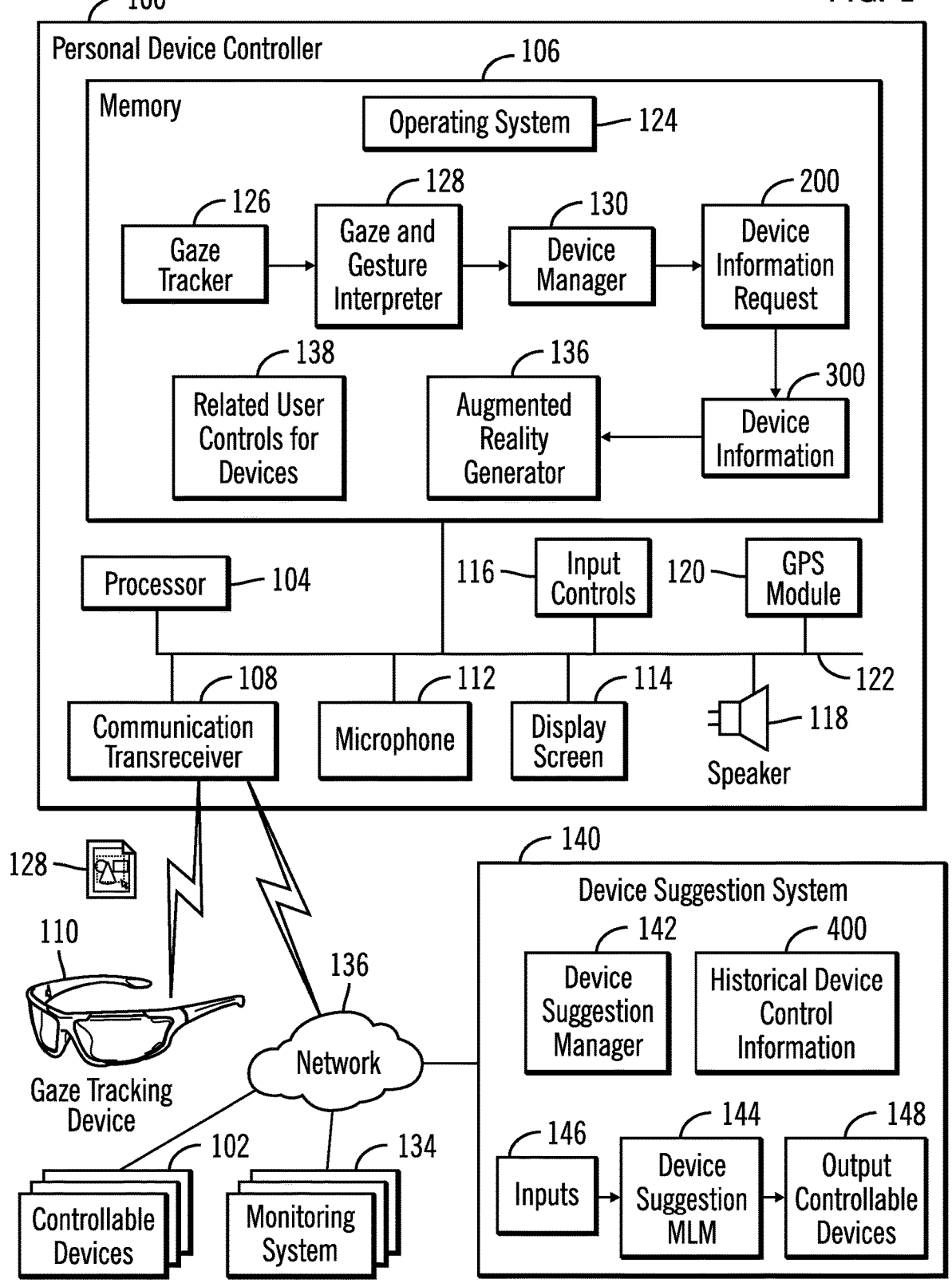
FIG. 1 illustrates an embodiment of a personal device controller interfacing with a gaze tracking device.

FIG. 1 illustrates an embodiment of a personal device controller 100 configured to render augmented reality representations of controllable devices 102 in a field of view on an axis of a user line-of-sight. The personal device controller 100 includes a processor 104, a main memory 106, a communication transceiver 108 to communicate (via wireless communication or a wired connection) with external devices, including a wearable gaze tracking device 110, controllable devices 102, monitoring systems 134, and device suggestion system 140; a microphone 112 to receive as input sound external to the personal device controller 100; a display screen 114 to render display output to a user of the personal device controller 100; a speaker 116 to generate sound output to the user; input controls 118 such as buttons and other software or mechanical buttons, including a keyboard, to receive user input; and a global positioning system (GPS) module 120 to determine a GPS potions of the personal computing device. The components 104-120 may communicate over one or more bus interfaces 122.

The main memory 106 may include various program components including an operating system 124 to manage the personal device controller 100 operations and interface with device components 104-120; a gaze tracker program 126 to interface with the gaze tracking device 110 to render augmented reality representations overlayed over a field of view and select devices 102 detected by eye tracking cameras that acquire the gazed image 128, or device 102, on which the tracked eye is fixed and information on coordinates of an axis of a line-of-sight, also referred to as sightline, visual axis, the user is viewing within the field of vision 128 captured by the gaze tracking device 110; a gaze and gesture interpreter 128 to track and interpret the eye gaze of a user and hand gestures in real-time, and enable the user to select a target region of the field of view or controls on a controllable device 102 by interpreting hand gestures and eye tracking; a device manager 130 to manage user selections of target regions and device controls to generate a device information request 200 to transmit to monitoring systems 134 that capture information on the controllable devices 102, such as using cameras to capture images of the controllable devices 102 and communicate with the controllable devices 102 to gather current state of device controls; device information 300 received from the monitoring systems 134, or devices 102, in response to the device information request 200 having information on controllable devices 102, such as images, descriptions, etc; an augmented reality generator 136 to generate augmented reality representations for controllable devices 102 in an axis of the user line-of-sight in the gaze tracking device 110 glass based on the received device information 300; and related user controls 138 for the devices 102, such as user controls to be performed at a device after user controls are selected for the same or different device 102.

The gaze tracking device 110 includes computer display capabilities to display information and augmented reality representations from the computer 100, including to project augmented reality representations on the gaze tracking device 110 glass or display for the user to view.

The term "augmented reality" as used herein refers to augmented reality, mixed reality, and other visual representations in which augmented reality images and information are rendered overlayed on a real world field of view.

The monitoring systems 134 may comprise Internet of Things (IoT) devices that gather information on the controllable devices 102, which also communicate in the IoT. Further, the controllable devices 102 may comprise Internet of Things (IoT) devices with which the personal device controller 100 may directly communicate via the transceiver 108 to obtain information on the controls at the devices 102.

The personal device controller 100 may communicate with a device suggestion system 140 to obtain information on controllable devices 102 to render in the gaze tracking device 110. The device suggestion system includes a manager 142 to manage operations and historical device control information 400 gathered from one or more personal device controllers 100 on the results of users submitting user controls to controllable devices rendered in the gaze tracking device 110. The device suggestion system 140 includes a device suggestion machine learning module ("MLM") 144 to receive inputs 146 from a user at a personal device controller 100 concerning the user, environmental parameters of an environment in which the user is operating and generate output controllable devices 148 to render in the gaze tracking device 110 for the user to control.

In certain embodiments, the device suggestion MLM 144 may use machine learning and deep learning algorithms, such as decision tree learning, association rule learning, neural network, inductive programming logic, support vector machines, Bayesian network, etc. For artificial neural network program implementations, the neural network may be trained using backward propagation to adjust weights and biases at nodes in a hidden layer to produce the computed output 148. In backward propagation used to train a neural network machine learning module, biases at nodes in the hidden layer are adjusted accordingly to produce the output controllable device 148 having specified confidence levels based on the input parameters 146, such as user information and environmental parameters in which the user is operating. Backward propagation may comprise an algorithm for supervised learning of artificial neural networks using gradient descent. Given an artificial neural network and an error function, the method may calculate the gradient of the error function with respect to the neural network's weights and biases.

In backward propagation used to train a neural network machine learning module, such as the device suggestion MLM 144, margin of errors are determined based on a difference of the calculated predictions and whether the output controllable device 148 was in fact controlled by the user. This information on whether the user controlled the output controllable devices 148 may be used to modify the confidence levels of the output controllable devices 148 based on the inputs 146. Biases at nodes in the hidden layer are adjusted accordingly to decrease the confidence levels for the output controllable devices 148 rendered in the gaze tracking device 110 the user did not control and increase the confidence levels for the output controllable devices 148 rendered in the gaze tracking device 110 the user did control.

In certain embodiments, the device suggestion MLM 144 may be trained using inputs 146 from the historical device control information 400 to produce the output controllable devices 148.

In an alternative embodiment, the device suggestion MLM 144 may be implemented not as a machine learning module, but implemented using a rules based system to determine the outputs from the inputs.

In FIG. 1, the device suggestion MLM 144 and device suggestion manager 142 are implemented in a separate device suggestion system 140. In an alternative embodiment, the device suggestion MLM 144 and device suggestion manager 142 may be implemented in the personal device controller 100.

The arrows shown in FIG. 1 between the components and objects in the memory 106 represent a data flow between the components.

The personal device controller 100 may comprise a smart phone, personal digital assistance (PDA), smartwatch or stationary computing device capable of processing user information observed through the gaze tracking device 110. In further implementations, the personal device controller 100 may be integrated in the electronics of the gaze tracking device 110.

The transceiver 108 may include Bluetooth, Wi-Fi, cellular, and/or other communication technologies. (Bluetooth is a registered trademark of Bluetooth SIG, Inc., WIFI is a trademark of the Wi-Fi Alliance)

The memory 106 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc.

The bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Generally, program modules, such as the program components 124, 126, 128, 130, 136, 142, 144 may comprise routines, programs, objects, components, logic, data structures, and so on that perform particular tasks or implement particular abstract data types. The program modules may be practiced in distributed cloud computing environments where tasks are performed by remote processing devices that are linked through a communications network. In a distributed cloud computing environment, program modules may be located in both local and remote computer system storage media including memory storage devices.

The program components and hardware devices of the personal device controller 100 of FIG. 1 may be implemented in one or more computer systems. If they are implemented in multiple computer systems, then the computer systems may communicate over a network.

The program components 124, 126, 128, 130, 136, 142, 144 may be accessed by a processor from a memory 106 to execute. Alternatively, some or all of the program components 124, 126, 128, 130, 136, 142, 144 may be implemented in separate hardware devices, such as Application Specific Integrated Circuit (ASIC) hardware devices.

The functions described as performed by the program components 124, 126, 128, 130, 136, 142, 144 may be implemented as program code in fewer program modules than shown or implemented as program code throughout a greater number of program modules than shown.

Figure 2:
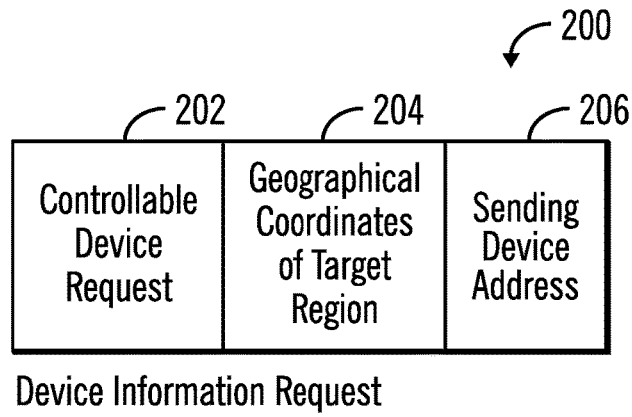
FIG. 2 illustrates an embodiment of a device information request to request information on devices in a field of view of a user.

FIG. 2 illustrates an embodiment of a device information request 200 the device manager 130 may broadcast to request information on controllable devices 102 in the user's field of vision, including: a controllable device request command 202; geographical coordinates 204 of a target region having controllable devices 102 for which the information is requested; and a sending device address 206 of the personal device controller 100.

Figure 3:
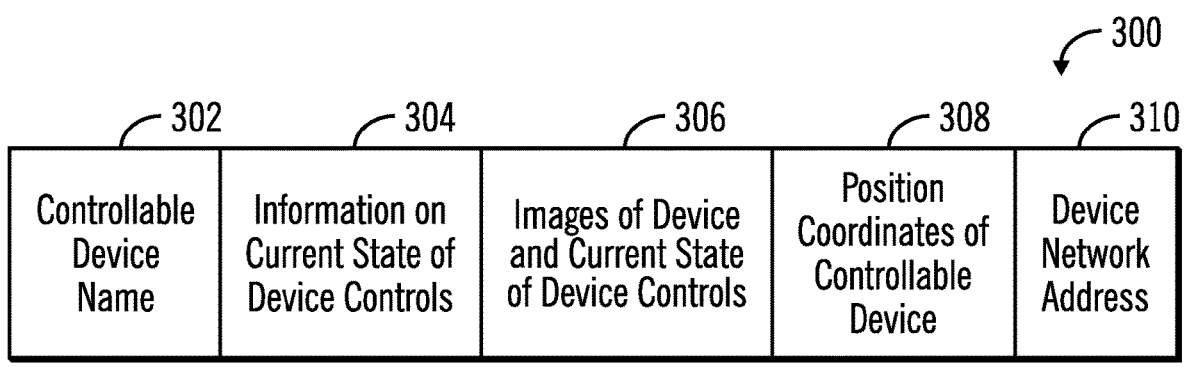
FIG. 3 illustrates an embodiment of device information received in response to a device information request.

FIG. 3 illustrates an embodiment of device information 300 received from a monitoring system 134 or directly from the controllable device 102 responding to the device information request 200, and includes: a controllable device name 302 or identifier; information on current state of device controls 304; images of device 302 and current state of device controls 306; position coordinates 308 of the controllable device 302; and a device network address 310.

Figure 4:
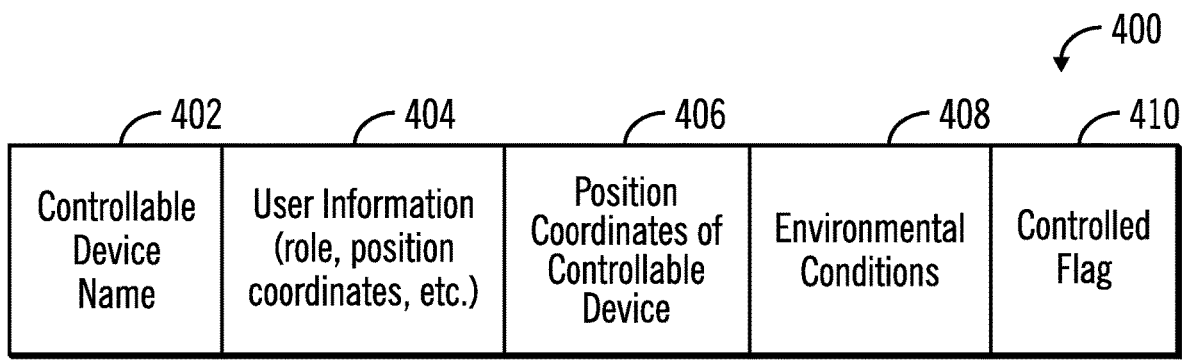
FIG. 4 illustrates an embodiment of historical device control information indicating whether the user interacted with a device in the field of view rendered in the gaze tracking device.

FIG. 4 illustrates an embodiment of historical device control information 400 the device manager 130 generates based on user control of the controllable devices 102 for which information is rendered in the gaze tracking device 110, and includes: a controllable device name 402 or identifier; user information 404, such as user role in organization, authorization level, user position coordinates, etc.; position coordinates of the controllable device 406; environmental conditions 408, such as building, time of day, temperature, and other business operating conditions relevant to what devices need to be controlled, etc.; and a controlled flag 410 indicating whether the user submitted controls to control the device 402 while rendered in the gaze tracking device 110.

Figure 5:
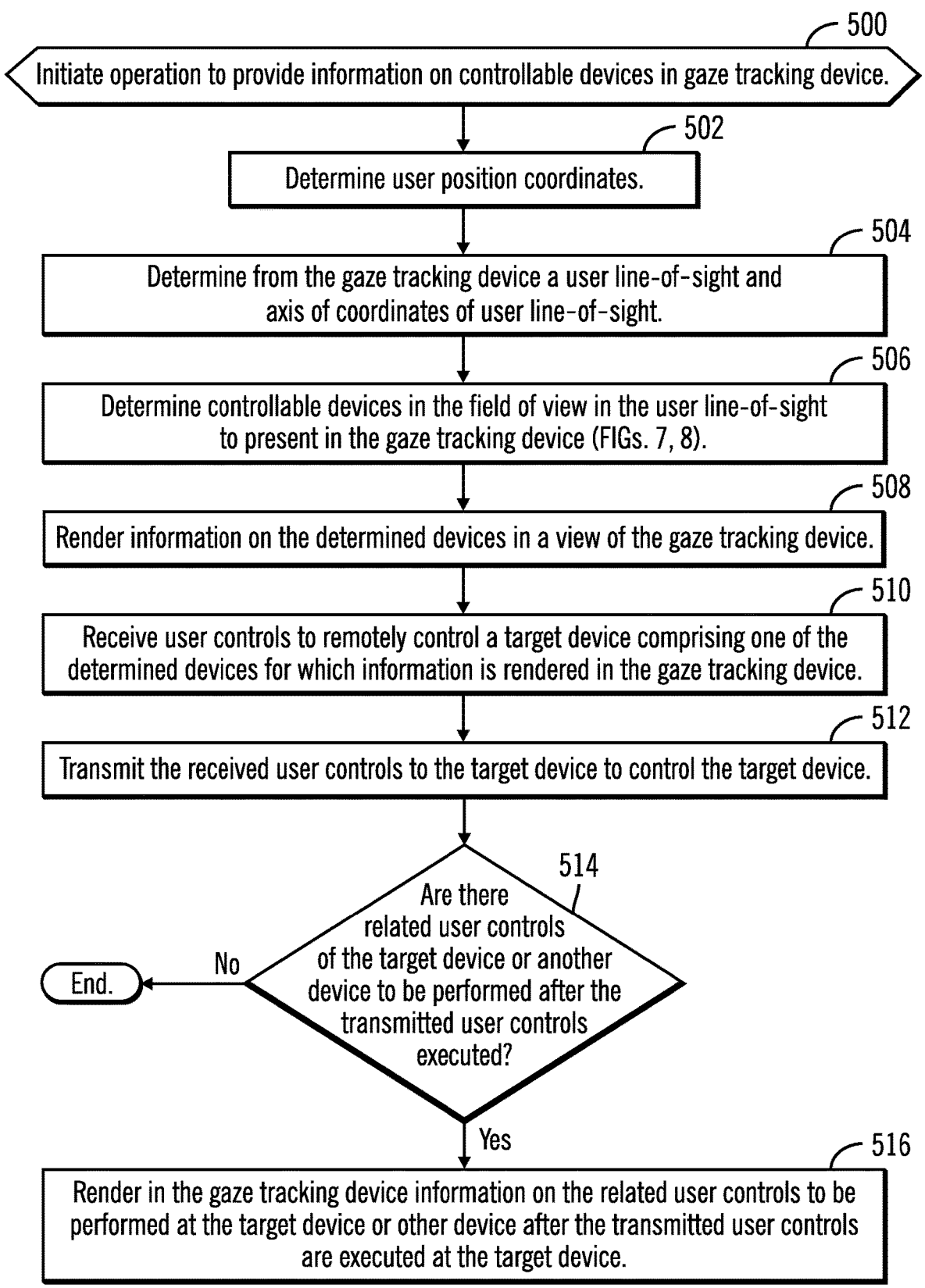
FIG. 5 illustrates an embodiment of operations to render information on devices in a user field of view in a gaze tracking device the user may remotely control.

FIG. 5 illustrates an embodiment of operations performed by the device manager 130 and other components of the personal device controller 100 to render information on controllable devices 102 in the gaze tracking device 110 for the user of the personal device controller 100 to control. Upon initiating (at block 500) operations to provide information on controllable devices 102 in the gaze tracking device 110 view, the device manager 130 determines (at block 502) user position coordinates from the GPS module 120 and determines (at block 504) from the gaze tracking device 110 a user line-of-sight and axis of coordinates of user line-of-sight. The device manager 130 may determine (at block 506) controllable devices 102 in the field of view in the user line of sight to present in the gaze tracking device, further described in FIGS. 7 and 8. Information on the determined devices is rendered (at block 508) in the view of the gaze tracking device 110, such as with augmented reality representations overlayed over the actual field of view. The device manager 130 receives (at block 510) from the gaze and gesture interpreter 128 user controls to remotely control a target device 102 comprising one of the determined devices for which information is rendered in the gaze tracking device 110. The gaze and gesture interpreter 128 may interpret user hand controls and eye movements to determine the controllable device 102 on which the user is gazing and the selected user controls to provide to the device manager 130. The received controls are transmitted (at block 512) to the target device 102 to control the target device 102.

If (at block 514) there are related user controls 138 of the target device 102 or another device to be performed after the transmitted user controls are executed at the target device 102, then the device manager 130 renders (at block 516) in the gaze tracking device 110 information, such as in augmented reality representations, on the related user control to be performed at the target device 110 or another device after the transmitted user controls are executed at the target device 102. If (at block 514) there are no related user controls 138 for the target device 102 user controls just executed, then control ends.

With the embodiment of FIG. 5, information on devices in the user field of view are rendered using augmented reality representations in a gaze tracking device 110 to enable the user to control the device by interpreting user gestures or eye gazing as specific device user controls and then transmit those user controls to the target device 102. In this way, described embodiments provide techniques to use a gaze tracking device 110 to allow a user to control devices in the user field of view to provide for remote control of controllable devices 102. For instance, the user may be wearing the gaze tracking device 110 in an industrial factory filled with numerous machines or a server farm filled with numerous racks of servers and storages, etc. In such cases, the user may control the machines or servers using the gaze tracking device 110.

Further, by identifying related user controls, the user is alerted of necessary related operations to perform. For example, if the user is required to turn off switch B 15 minutes after turning on switch A, then the gaze tracking device 110 is controlled to render switch B and related controls 15 minutes after turning on switch A so that the user can turn off switch B.

In further embodiments, the operations of FIGS. 5-8 may only be performed in response to determining that the user is having difficulty selecting a device in the field of view that is far away. If the user is not experiencing difficulty in selecting and controlling devices in the larger field of view using the gaze tracking device 110, then the operations of FIGS. 5-8 may not be performed.

In the embodiment of FIG. 5, while interacting with the augmented reality representation of devices in the user field of view, the gaze tracking device 110 may continually identify the user's line of sight, and accordingly display the augmented reality representation of the device controls. The devices displayed to the user will dynamically change based on the change in the line-of-sight of the user.

In the embodiment of FIG. 5, the augmented reality represented device information may include devices 102 whose view is obstructed in the user field of view by other devices 102 or things.

Figure 6:
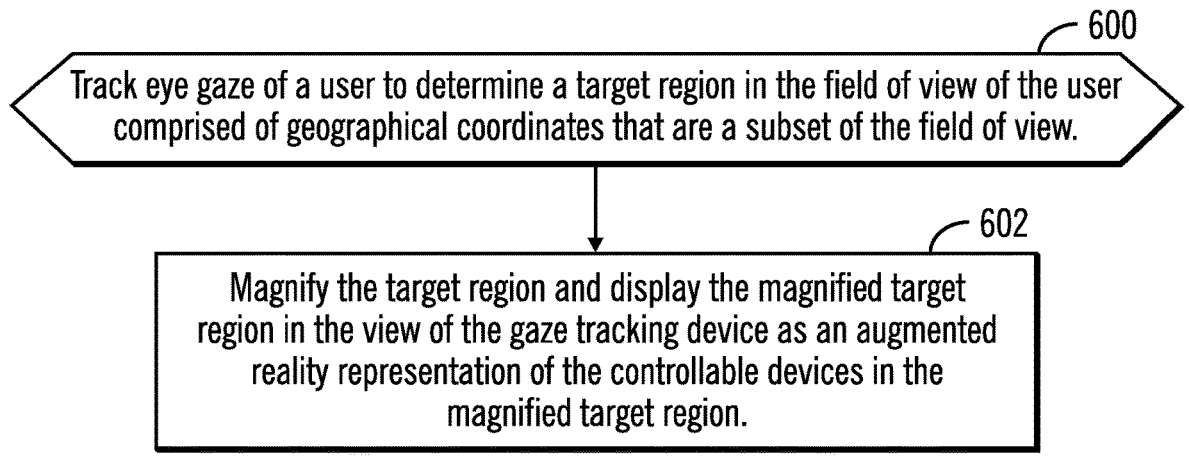
FIG. 6 illustrates an embodiment of operations to display a magnified target region of the user field of view providing an augmented reality representation of controllable devices in the magnified target region for the user to control.

FIG. 6 illustrates an embodiment of operations performed by the gaze and gesture interpreter 128, gaze tracker 126, and augmented reality generator 136 of the personal device controller 100 as part of the operations performed at blocks 506 and 508 in FIG. 5 to render information on the controllable devices 102 in the field of view. Upon the gaze and gesture interpreter 128 tracking (at block 600) the eye gaze of a user to determine a target region in the field of view of the user comprised of geographical coordinates that are a subset of the larger field of view, the augmented reality generator 136 may magnify (at block 602) the target region to display the magnified target region as an augmented reality representation in the view of the gaze tracking device 110 showing the controllable devices in the magnified target region. After magnifying the target region, the operations at block 510 et seq. in FIG. 5 may be performed to allow the user to control devices 102 rendered in the magnified target region presented as an augmented reality representation that is virtually positioned closer to the user in the field-of-view than its actual physical position.

With the embodiment of FIG. 6, the user may select a target region that is a subset of the field of view to magnify using augmented reality to enhance the ability of the user to use hand gestures or eye movement to generate controls to transmit to devices 102 in the selected target region. By expanding the size of the devices 102 in the target region and placing those devices virtually closer to the user, the user may more easily direct user controls to the device 102 using hand gestures and eye movement as the magnified devices appear larger in the gaze tracking device 110 view.

Figure 7:
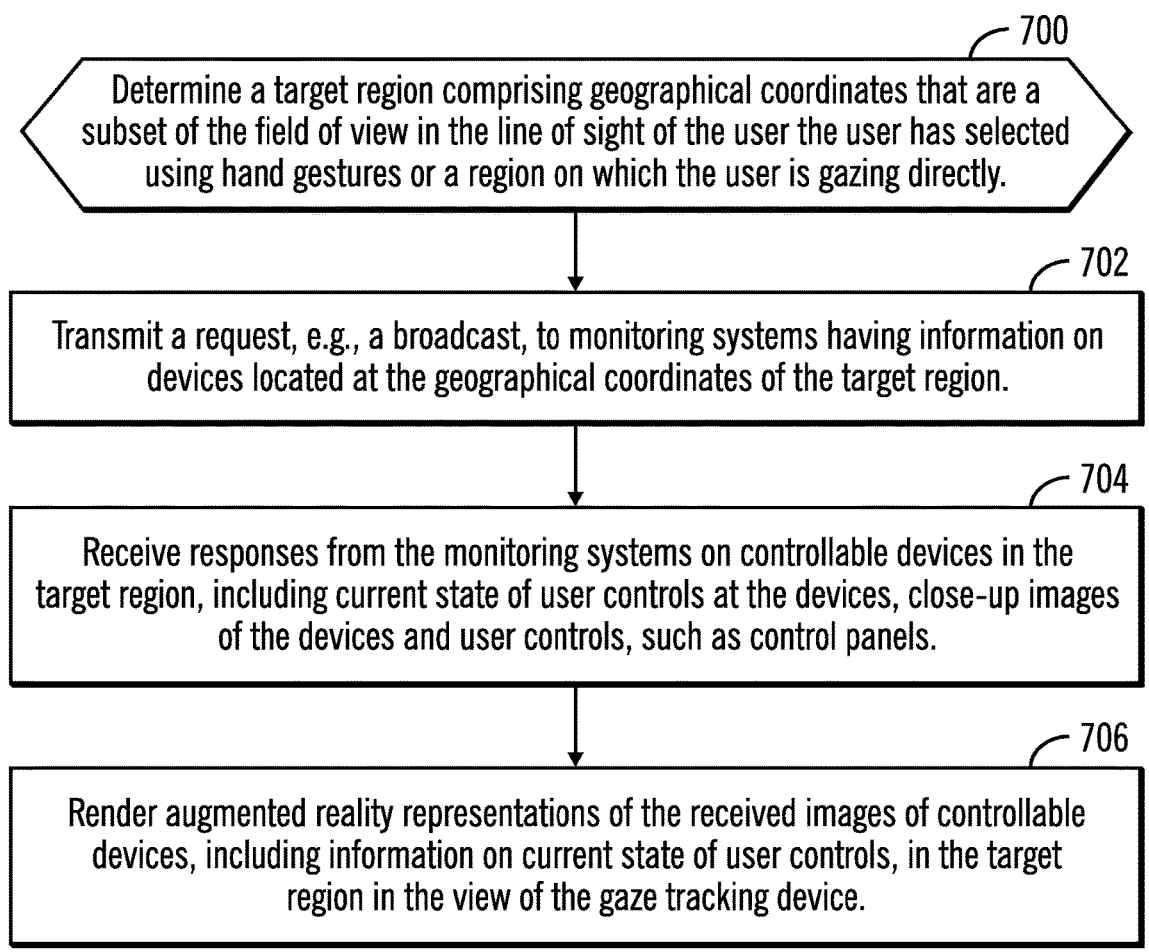
FIG. 7 illustrates an embodiment of operations to render augmented reality representations of devices in a target region of the user field of view for the user to control.

FIG. 7 illustrates an embodiment of operations performed by components in the personal device controller 100, such as the gaze tracker 126, gaze and gesture interpreter 128, the device manager 130, and the augmented reality generator 136 as part of the operations performed at blocks 506 and 508 in FIG. 5 to determine information on controllable devices 102 in a target region to render as augmented reality images overlayed in the gaze tracking device 110 view. A target region is determined (at block 700) comprising geographical coordinates that are a subset of the field of view in the line of sight of the user the user has selected using hand gestures or a region on which the user is gazing directly. The target region may be determined from the gaze and gesture interpreter 128 tracking eye movements toward a target region in a field of view or by interpreting hand gestures selecting a target region of the field of view, or by other means such as voice commands via the microphone 112. The device manager 130 transmits (at block 702), via the transceiver 108, a device information request 200, e.g., a broadcast, to monitoring systems 134 having information on devices 102 located at the geographical coordinates of the target region. The transmission may comprise a broadcast of the device information request 200 toward all monitoring systems 13 in the field of view, and only those monitoring systems 134 monitoring devices 102 having coordinates in the target region would respond with device information 300 on the devices 102 that monitoring system 134 monitors in the target region. Monitoring systems 134 not monitoring devices 102 in the target region would ignore the transmission of the request 200.

The device manager 130 would then receive (at block 704), via the transceiver 108, device information responses 300 from the monitoring systems 134 on controllable devices 102 in the target region, including current state of user controls at the devices, close-up images of the devices and user controls. The rendering of the user controls for the device 102 may be virtual controls the user can manipulate or select or an image of controls on a control panel if the device 102 has a control panel. The monitoring systems 134 may include cameras to capture images of the devices 102, such as in real time, or electronically communicate directly with the devices 102 to determine the current state of their controls. The augmented reality generator 136 may render (at block 706) augmented reality representations of the received images of controllable devices 102, including information on current state of user controls, in the target region in the view of the gaze tracking device 110. The augmented reality representations of the received images may appear closer in the line-of-sight of the user than they are actually geographically positioned to provide an expanded view of the devices 102 to make it easier for the user to select and direct commands to those devices presented in the expanded view.

With the embodiment of FIG. 7, real-time information on devices 102 in the selected target region is gathered from monitoring systems 134 monitoring devices 102 in the target region to provide current information on status and controls at the devices 102 and detailed images of the target devices 102 to improve the ability of the user to control the target devices 102 using eye movement, hand gestures, voice commands and other means. In an alternative embodiment, the personal device controller 100 may communicate directly with the devices 102 in the target region to obtain information on a current state of user controls at the devices 102.

Figure 8:
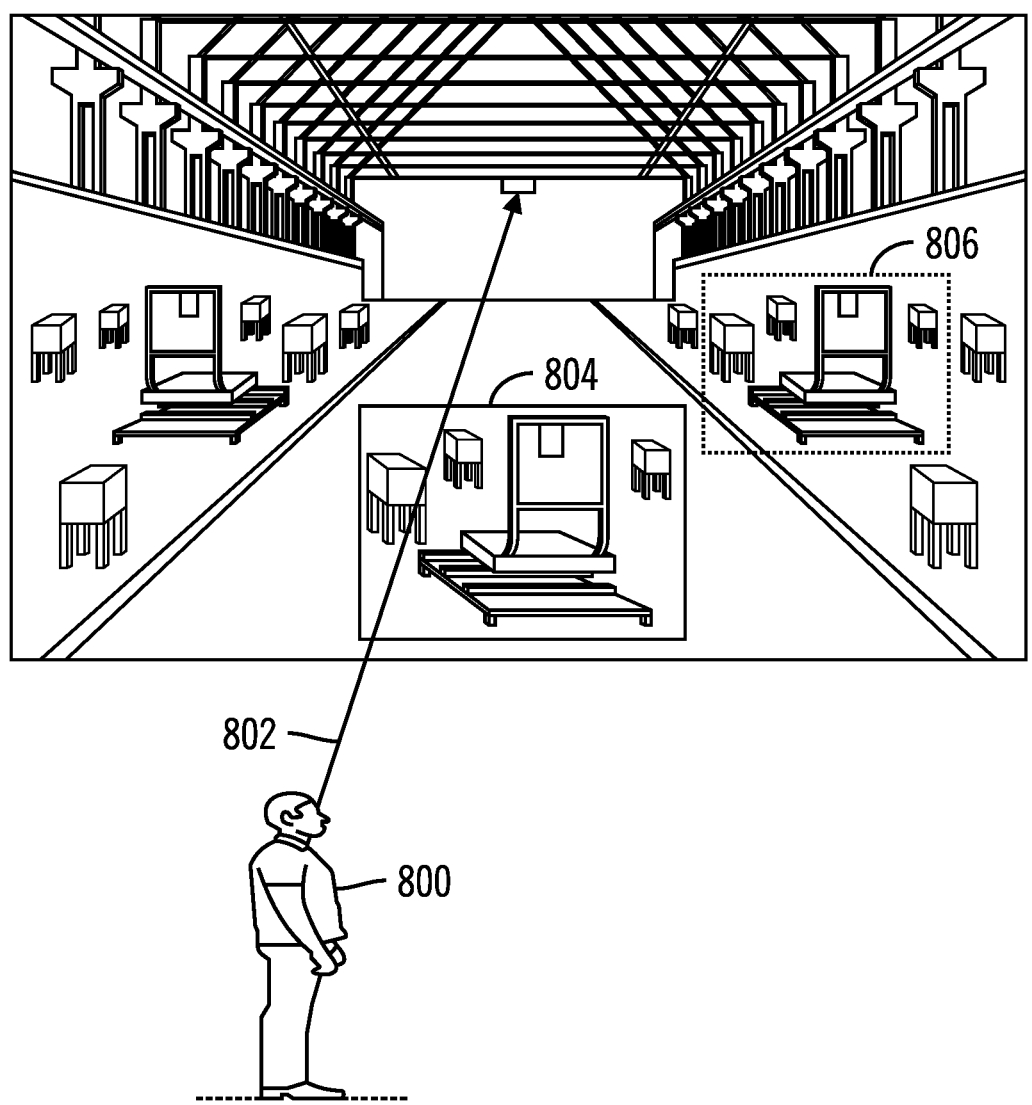
FIGS. 8 and 9 illustrate an example of how augmented reality representations are rendered for devices in a user field of view.

FIG. 8 illustrates an example of a user 800 of the personal device controller 100 viewing in a line-of-sight 802 a factory floor with numerous controllable devices. Performing the operations of FIGS. 5, 6, and 7, the gaze tracking device 110 may render an expanded representation 804 of controllable devices in a selected target region 806 that appear closer and larger in the user 800 line-of-sight 802 than their actual position. The expanded representation 804 may comprise a camera zoom magnification of the target region 806 in the field of view (FIG. 6) or augmented reality representations of images of the devices in the target region 806 provided by the monitoring systems 134 and devices 102 directly (FIG. 7).

Figure 9:
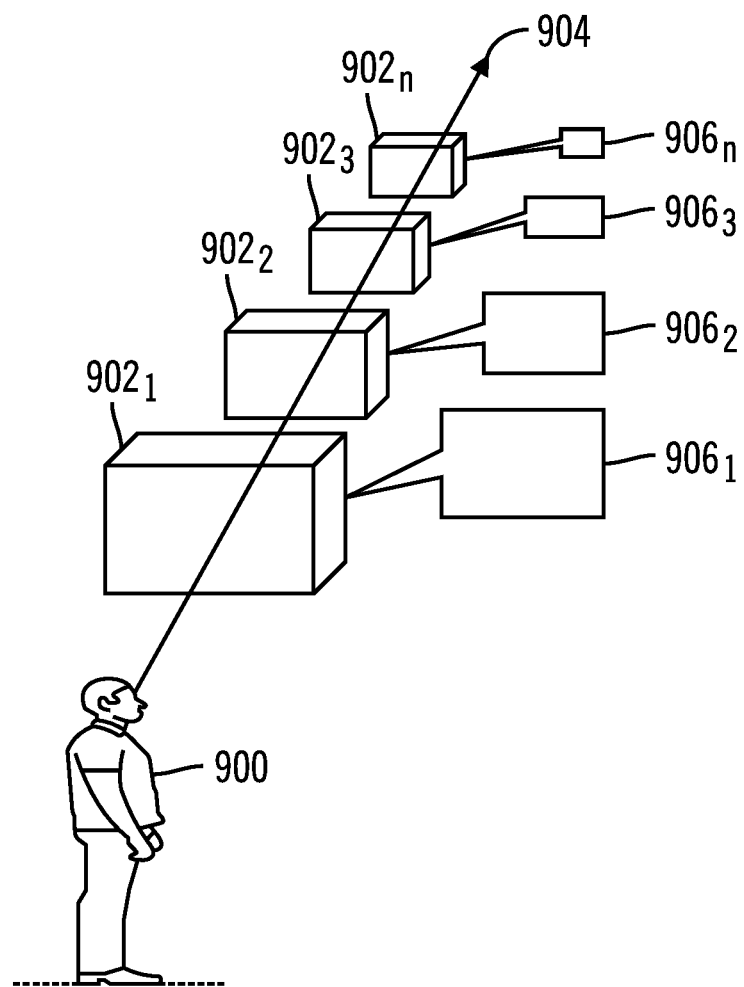

FIG. 9 illustrates an example of the user 900 of the gaze tracking device 110 viewing augmented reality representations of devices $902_1, 902_2, 902_3 \ldots 902_n$, along an axis of the line-of-sight 904 in a target region using the gaze tracking device 110. Devices $902_2 \ldots 902_n$ following the first device $902_1$ in the axis of the line-of-sight 904 may be visible or obscured by objects or other obstructions. In the example of FIG. 9, the augmented reality representations of devices $902_1, 902_2, 902_3 \ldots 902_n$ may comprise images of the devices 102 in a target region and the augmented reality representations $906_1, 906_2, 906_3 \ldots 906_n$ may comprise additional information on the devices, such as a current state of the user controls. The gaze tracking device 110 may further allow the user to use eye movements, hand gestures or voice commands to depth scroll through the augmented reality representations of the devices $902_1, 902_2, 902_3 \ldots 902_n$ to have a selected augmented reality representation $902_i$ further away in the line-of-sight 904 appear closer and large in the line-of-sight 906 than devices 102 that are physically closer.

In a further embodiment, the user may perform depth scrolling to sequentially select augmented reality representations of the devices, such as by entering movement via wrist movements or other input controls. The selected augmented reality representation will appear to move towards the user by displaying the selected augmented reality representation with larger dimensions as the first augmented reality representation in the line-of-sight. Augmented reality representations between the user and the selected augmented reality representations will appear to be moving away by being displayed following the selected augmented reality representation in the line of sight and smaller than the selected augmented reality representation. Increasing the dimensions and additional content in the selected augmented reality representations allows the user to visualize additional required content in the selected augmented reality representation.

Augmented reality representations $906_2 \ldots 906n$ a further depth or distance from the user are rendered smaller with less information on the associated devices. A selected augmented reality representation of a device is rendered with larger dimensions to render more information and description for the selected device.

With the embodiment of FIGS. 8 and 9, user gestures and/or voice commands to select augmented reality representations at different distances or depths in the perspective view can visually move the selected object forward in the user line-of-sight 904 for better viewability. If an augmented reality representation at a distance is brought forward by the user, then additional digital information associated with the augmented reality representation (which may provide more information about the real-world device) will be shown to the user.

Figure 10:
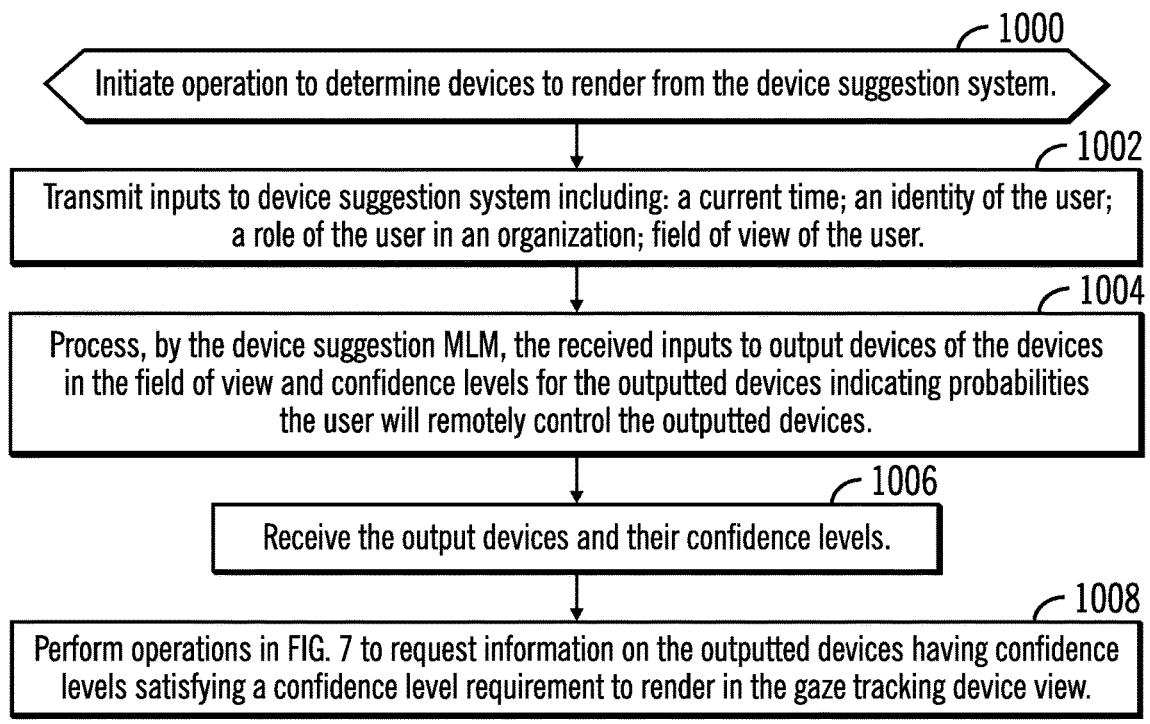
FIG. 10 illustrates an embodiment of operations to obtain information on devices in a field of view from a device suggestion machine learning module to render in a gaze tracking device.

FIG. 10 illustrates an embodiment of operations performed by the device manager 130 of the personal device controller 100, device suggestion manager 142 and device suggestion MLM 144 to determine devices 102 in the field of view of the user or a target region for the user to render in an expanded view in the gaze tracking device 110, such as in augmented reality representations. Upon initiating (at block 1000) an operation to determine devices 102 to render from the device suggestion system 140, the device manager 130 in the personal device controller 100 transmits (at block 1002) inputs 146 to the device suggestion system 140 such as: a current time; an identity of the user; a role of the user in an organization; user authorization level, field of view coordinates of the user, target region, location of the user, etc. The device suggestion MLM 144 processes (at block 1004) the received inputs 146 to output 148 at least one device 102 of the devices in the field of view, facility or target region and confidence levels for the outputted devices 148 indicating probabilities the user will remotely control the outputted devices 148. The device manager 130 receives (at block 1006) the output devices 148 and their confidence levels. The device manager 130 may perform the operations of FIG. 7 to request information on the outputted devices having confidence levels satisfying a confidence level requirement to render in the gaze tracking device 110 view. Alternatively, the device suggestion manager 142 may only return to the personal device controller 100 those output devices 148 having confidence levels satisfying a confidence level requirement, e.g., 90%.

With the embodiment of FIG. 10, the personal device controller 100 may invoke a device suggestion MLM 144 to determine the devices 102 to render in augmented reality representations in the gaze tracking device 110 view based on the user, environmental parameters in which the user is operating, and other information relevant to estimating the devices the user is likely to want to control in this particular situation. Using the device suggestion MLM 144 provides the user with augmented reality enhanced representations of those devices 102 which the user is most likely to want to control in the given situation.

In one example, the device suggestion MLM 144 is trained to analyze user behavior to understand machine control tasks the user performs at specific times on a regular basis. For example, the user may turn on a switch at 9 AM every day. The gaze tracking device 110 may be controlled to render a virtual image of the switch to the user at 9 AM after learning this behavior/pattern so that the user will be able to turn on the switch even if the user is not gazing in the direction of the switch.

Figure 11:
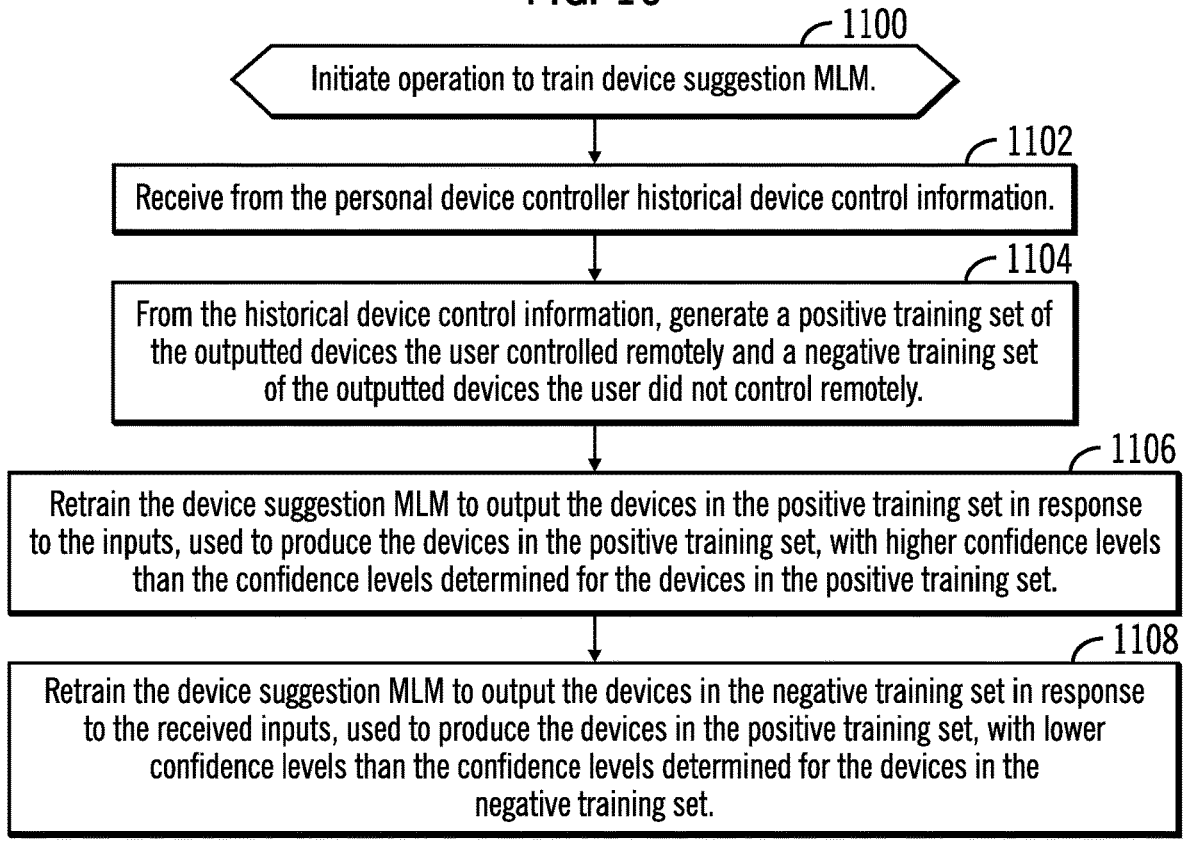
FIG. 11 illustrates an embodiment of operations to train the device suggestion machine learning module to output devices to render with augmented reality representations.

FIG. 11 illustrates an embodiment of operations performed by the device suggestion manager 142 and device suggestion MLM 144 to retrain the device suggestion MLM 144 based on new historical device control information 400 of the user deciding whether to control or not control devices 102 rendered as augmented reality representations in the gaze tracking device 110. The device suggestion system 140 may receive updated historical device control information 400 from multiple personal device controllers 100 operated by different users. Upon initiating an operation to train the device suggestion MLM 144, the device suggestion manager 142 generates (at block 1104) a positive training set of the outputted devices from the historical device control information 400 the user controlled remotely, as indicated in the controlled flag 410, and a negative training set of the outputted devices from the historical device control information 400 the user did not control remotely, as indicated in the controlled flag 410. The device suggestion MLM 144 is retrained (at block 1106) to output the devices in the positive training set, in response to the received inputs used to previously output the devices in the positive training set, with higher confidence levels than the confidence levels determined for the devices in the positive training set. The device suggestion MLM 144 is retrained (at block 1108) to output the devices in the negative training set, in response to the received inputs used to previously output the devices in the negative training set, with lower confidence levels than the confidence levels determined for the devices in the negative training set.

For artificial neural network program implementations of the device suggestion MLM 144, the neural network 144 may be trained using backward propagation to adjust weights and biases at nodes in a hidden layer to produce the computed output. In backward propagation used to train a neural network machine learning module, biases at nodes in the hidden layer are adjusted accordingly to produce the devices 102 having specified confidence levels based on the input 146 used to previously produce the output 148. Backward propagation may comprise an algorithm for supervised learning of artificial neural networks using gradient descent. Given an artificial neural network and an error function, the method may calculate the gradient of the error function with respect to the neural network's weights and biases.

With the embodiment of FIG. 11, the device suggestion MLM 144 may be continually retrained to improve the devices outputted based on the specific inputs 146 and the confidence levels determined for the output devices to increase the likelihood the user is presented with only those devices the user is likely to want to control and not presented with augmented reality representations of devices the user will not be interested in controlling.

Figure 12:
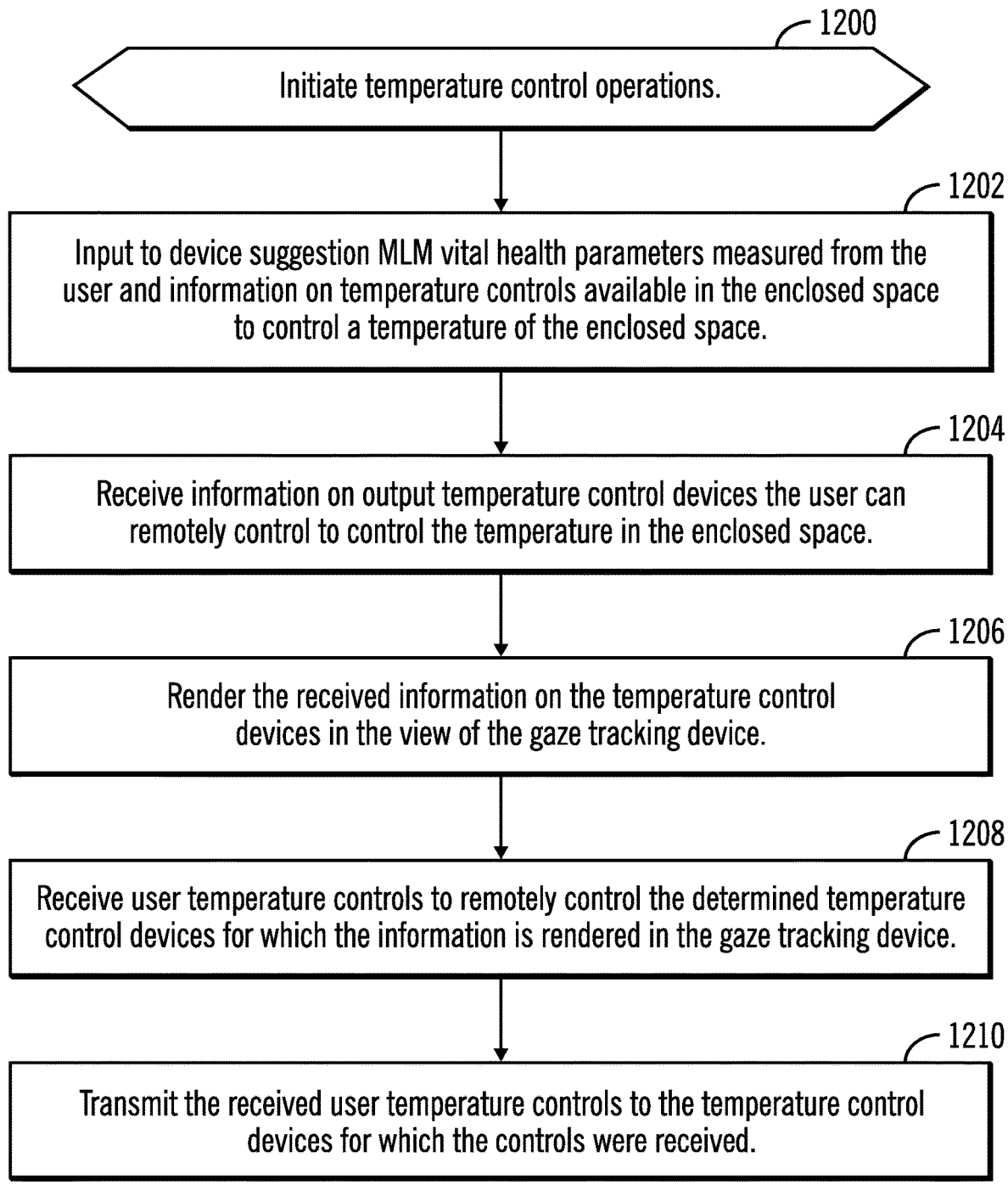
FIG. 12 illustrates an embodiment of operations to determine information on temperature control devices to render in a gaze tracking device.

FIG. 12 illustrates an embodiment of operations performed where the device suggestion MLM 144 is used to suggest temperature control devices based on health parameters of the user of the gaze tracking device 110. Upon initiating (at block 1200) temperature control operations, vital health parameters measured from the user (e.g., temperature, blood pressure, oxygen levels, etc.) and information on temperature controls available in the enclosed space are inputted (at block 1202) to the device suggestion MLM 144 to output temperature control devices the user can remotely control to control the temperature in the enclosed space. The device manager 130 receives (at block 1204) information on output temperature control devices from the device selection MLM 144 and renders (at block 1206) the received information on the temperature control devices in the view of the gaze tracking device 110. The device manager 130 receives (at block 1208) user temperature controls to remotely control the determined temperature control devices for which the information is rendered in the gaze tracking device. The user controls may be detected by the gaze and gesture interpreter 128 from tracking eye movement and hand gestures. The device manager 130 transmits (at block 1210) the received user temperature controls to the temperature control devices for which the controls were received.

With the embodiment of FIG. 12, the device suggestion MLM 144 may receive as input real-time measured user health parameters, such as measured via a smart watch or other wearable device, and then use that information to determine whether temperature control devices should be suggested for the user to control if their measured health parameters indicate they are experiencing discomfort, as indicated by the input user health parameters, which can be alleviated by altering temperature controls for the temperature controlled enclosed space where the user is located.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
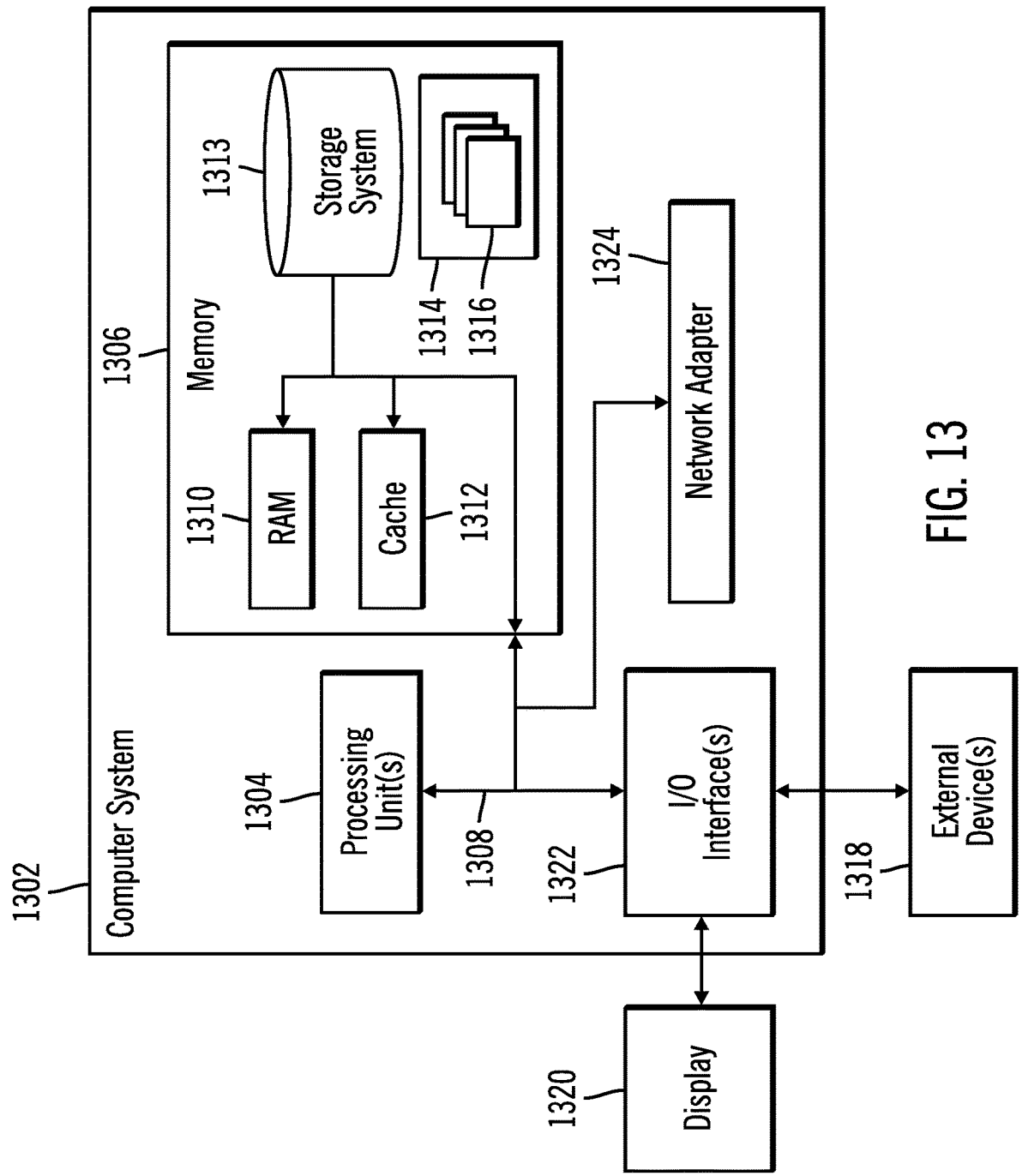
FIG. 13 illustrates a computing environment in which the components of FIG. 1 may be implemented.

The computational components of FIG. 1, including the personal device controller, gaze tracking device 110, controllable devices 102, monitoring system 134, and device suggestion system 140 may be implemented with one or more computer systems, such as the computer system 1302 shown in FIG. 13. Computer system/server 1302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, the computer system/server 1302 is shown in the form of a general-purpose computing device. The components of computer system/server 1302 may include, but are not limited to, one or more processors or processing units 1304, a system memory 1306, and a bus 1308 that couples various system components including system memory 1306 to processor 1304. Bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1302 typically includes a variety of computer system readable media. Such media may be any available media that is accessible by computer system/server 1302, and it includes both volatile and non-volatile media, removable and non-removable media.

System memory 1306 can include computer system readable media in the form of volatile memory, such as random access memory (RAM) 1310 and/or cache memory 1312. Computer system/server 1302 may further include other removable/non-removable, volatile/non-volatile computer system storage media. By way of example only, storage system 1313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1308 by one or more data media interfaces. As will be further depicted and described below, memory 1306 may include at least one program product having a set (e.g., at least one) of program modules that are configured to carry out the functions of embodiments of the invention.

Program/utility 1314, having a set (at least one) of program modules 1316, may be stored in memory 1306 by way of example, and not limitation, as well as an operating system, one or more application programs, other program modules, and program data. Each of the operating system, one or more application programs, other program modules, and program data or some combination thereof, may include an implementation of a networking environment. The components of the computer 1302 may be implemented as program modules 1316 which generally carry out the functions and/or methodologies of embodiments of the invention as described herein. The systems of FIG. 1 may be implemented in one or more computer systems 1302, where if they are implemented in multiple computer systems 1302, then the computer systems may communicate over a network.

Computer system/server 1302 may also communicate with one or more external devices 1318 such as a keyboard, a pointing device, a display 1320, etc.; one or more devices that enable a user to interact with computer system/server 1302; and/or any devices (e.g., network card, modem, etc.) that enable computer system/server 1302 to communicate with one or more other computing devices. Such communication can occur via Input/Output (I/O) interfaces 1322. Still yet, computer system/server 1302 can communicate with one or more networks such as a local area network (LAN), a general wide area network (WAN), and/or a public network (e.g., the Internet) via network adapter 1324. As depicted, network adapter 1324 communicates with the other components of computer system/server 1302 via bus 1308. It should be understood that although not shown, other hardware and/or software components could be used in conjunction with computer system/server 1302. Examples, include, but are not limited to: microcode, device drivers, redundant processing units, external disk drive arrays, RAID systems, tape drives, and data archival storage systems, etc.

The letter designators, such as i and n, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing control of devices to render on a user operated gaze tracking device, the computer program product comprising a computer readable storage medium having computer readable program code embodied therein that executes to perform operations, the operations comprising:
   determining a field of view from the gaze tracking device of a user based on a user position;
   providing, to a machine learning module, inputs comprising information on the user and devices in the field of view of the user;
   processing, by the machine learning module, the inputs to output at least one device of the devices in the field of view of the user and a confidence level for each of the output at least one device indicating a probability the user will remotely control that device;
   rendering an augmented reality representation of information on the output at least one device having the confidence level satisfying a confidence level requirement in a view of the gaze tracking device;
   receiving user controls to remotely control a target device comprising one of the output at least one device rendered in the gaze tracking device; and
   transmitting the received user controls to the target device to control the target device.

2. The computer program product of claim 1, wherein the devices in the inputs are in a target region comprising geographical coordinates that are a subset of the field of view in a line of sight of the user, wherein the operations further comprise:
   transmitting a request to at least one system having information on the output at least one device located at the geographical coordinates of the target region; and
   receiving at least one response from the at least one system indicating user controls of the output at least one device, and wherein the rendered augmented reality representation of information in the view of the gaze tracking device includes the user controls indicated in the at least on response.

3. The computer program product of claim 2, wherein the at least one response indicates a current state of the user controls of the output at least one device in the target region, and wherein the rendered augmented reality representation of information includes the current state of the user controls of the output at least one device rendered as augmented reality images in the field of view of the user.

4. The computer program product of claim 3, wherein the rendered augmented reality representation of information on the current state of the user controls of the output at least one device comprises images of the user controls of the output at least one device captured by at least one of cameras at the at least one system or by the at least one system communicating with the output at least one device in the target region to determine the current state of the user controls.

5. The computer program product of claim 2, wherein the output at least one device in the target region for which information is rendered in the gaze tracking device include at least one device obstructed in the field of view of the user by another device.

6. The computer program product of claim 1, wherein the inputs processed by the machine learning module are members of a set of inputs comprising: a current time; an identity of the user; a role of the user in an organization; user authorization level, devices in the field of view the user has previously controlled; and time they were controlled.

7. The computer program product of claim 6, wherein the operations further comprise:
determining a positive training set of the output at least one device rendered in the gaze tracking device the user controlled remotely and a negative training set of the output at least one device rendered in the gaze tracking device the user did not control remotely;
retraining the machine learning module to output the devices in the positive training set, in response to the inputs, with higher confidence levels than the confidence levels determined for the devices in the positive training set; and
retraining the machine learning module to output the devices in the negative training set, in response to the inputs, with lower confidence levels than the confidence levels determined for the devices in the negative training set.

8. The computer program product of claim 1, wherein the operations further comprise:
in response to transmitting the user controls to the target device, determining a related user control of the target device or another device to be performed after the user controls are transmitted to the target device; and
rendering, in the gaze tracking device, an augmented reality representation of information on the related user control to be performed at the target device or another device after the user controls are transmitted to the target device.

9. The computer program product of claim 1, wherein the user position is within a temperature controlled enclosed space, wherein the operations further comprise:
inputting vital health parameters measured from the user and information on temperature controls available in the temperature controlled enclosed space to control a temperature of the temperature controlled enclosed space to the machine learning module to output temperature control devices the user can remotely control to control the temperature in the temperature controlled enclosed space; and
rendering augmented reality representations of the output temperature control devices in the view of the gaze tracking device for the user of the gaze tracking device to select to control the output temperature control devices.

10. A system for providing control of devices to render on a user operated gaze tracking device, comprising:
a processor;
a machine learning module; and
a computer readable storage medium having computer readable program code embodied therein that when executed by the processor performs operations, the operations comprising:
determining a field of view from the gaze tracking device of a user based on a user position;
providing, to the machine learning module, inputs comprising information on the user and devices in the field of view of the user;
processing, by the machine learning module, the inputs to output at least one device of the devices in the field of view of the user and a confidence level for each of the output at least one device indicating a probability the user will remotely control that device;
rendering an augmented reality representation of information on the output at least one device having the confidence level satisfying a confidence level requirement in a view of the gaze tracking device;
receiving user controls to remotely control a target device comprising one of the output at least one device rendered in the gaze tracking device; and
transmitting the received user controls to the target device to control the target device.

11. The system of claim 10, wherein the devices in the inputs are in a target region comprising geographical coordinates that are a subset of the field of view in a line of sight of the user, wherein the operations further comprise:
transmitting a request to at least one system having information on the output at least one device located at the geographical coordinates of the target region; and
receiving at least one response from the at least one system indicating user controls of the output at least one device, and wherein the rendered augmented reality representation of information in the view of the gaze tracking device includes the user controls indicated in the at least on response.

12. The system of claim 11, wherein the at least one response indicates a current state of the user controls of the output at least one device in the target region, and wherein the rendered augmented reality representation of information includes the current state of the user controls of the output at least one device rendered as augmented reality images in the field of view of the user.

13. The system of claim 10, wherein the inputs processed by the machine learning module are members of a set of inputs comprising: a current time; an identity of the user; a role of the user in an organization; user authorization level, devices in the field of view the user has previously controlled; and time they were controlled.

14. The system of claim 13, wherein the operations further comprise:
determining a positive training set of the output at least one device rendered in the gaze tracking device the user controlled remotely and a negative training set of the output at least one device rendered in the gaze tracking device the user did not control remotely;
retraining the machine learning module to output the devices in the positive training set, in response to the inputs, with higher confidence levels than the confidence levels determined for the devices in the positive training set; and
retraining the machine learning module to output the devices in the negative training set, in response to the inputs, with lower confidence levels than the confidence levels determined for the devices in the negative training set.

15. The system of claim 10, wherein the operations further comprise:
in response to transmitting the user controls to the target device, determining a related user control of the target device or another device to be performed after the user controls are transmitted to the target device; and
rendering, in the gaze tracking device, an augmented reality representation of information on the related user control to be performed at the target device or another device after the user controls are transmitted to the target device.

16. A method for providing control of devices to render on a user operated gaze tracking device, comprising:
determining a field of view from the gaze tracking device of a user based on a user position;

providing, to a machine learning module, inputs comprising information on the user and devices in the field of view of the user;

processing, by the machine learning module, the inputs to output at least one device of the devices in the field of view of the user and a confidence level for each of the output at least one device indicating a probability the user will remotely control that device;

rendering an augmented reality representation of information on the output at least one device having the confidence level satisfying a confidence level requirement in a view of the gaze tracking device;

receiving user controls to remotely control a target device comprising one of the output at least one device rendered in the gaze tracking device; and transmitting the received user controls to the target device to control the target device.

17. The method of claim 16, wherein the devices in the inputs are in a target region comprising geographical coordinates that are a subset of the field of view in a line of sight of the user, further comprising:

transmitting a request to at least one system having information on the output at least one device located at the geographical coordinates of the target region; and receiving at least one response from the at least one system indicating user controls of the output at least one device and wherein the rendered augmented reality representation of information in the view of the gaze tracking device includes the user controls indicated in the at least on response.

18. The method of claim 17, wherein the at least one response indicates a current state of the user controls of the output at least one device in the target region, and wherein the rendered augmented reality representation of information includes the current state of the user controls of the output at least one device rendered as augmented reality images in the field of view of the user.

19. The method of claim 16, wherein the inputs processed by the machine learning module are members of a set of inputs comprising: a current time; an identity of the user; a role of the user in an organization; user authorization level, devices in the field of view the user has previously controlled; and time they were controlled.

20. The method of claim 19, further comprising:

determining a positive training set of the output at least one device rendered in the gaze tracking device the user controlled remotely and a negative training set of the output at least one device rendered in the gaze tracking device the user did not control remotely;

retraining the machine learning module to output the devices in the positive training set, in response to the inputs, with higher confidence levels than the confidence levels determined for the devices in the positive training set; and retraining the machine learning module to output the devices in the negative training set, in response to the inputs, with lower confidence levels than the confidence levels determined for the devices in the negative training set.

* * * * *